United States Patent [19]
Kornylak

[11] 3,854,570
[45] Dec. 17, 1974

[54] VERTICAL CONVEYOR SHELF TILTING MECHANISM

[75] Inventor: Andrew T. Kornylak, Hamilton, Ohio

[73] Assignee: Kornylak Corporation, Hamilton, Ohio

[22] Filed: Apr. 20, 1973

[21] Appl. No.: 352,959

[52] U.S. Cl. .............................. 198/158, 198/155
[51] Int. Cl. ............................................. B65g 17/00
[58] Field of Search ............ 198/158, 155, 157, 138

[56] References Cited
UNITED STATES PATENTS

| | | | |
|---|---|---|---|
| 2,372,157 | 3/1945 | Burton | 198/138 |
| 2,747,724 | 5/1956 | Kornylak | 198/155 |
| 3,575,281 | 4/1971 | Sutton | 198/158 |

*Primary Examiner*—Evon C. Blunk
*Assistant Examiner*—Douglas D. Watts
*Attorney, Agent, or Firm*—Thomas E. Beall, Jr.

[57] ABSTRACT

Positive roller and channel guide control is provided for the tilting of shelves on an endless chain, vertical conveyor of the type wherein rollers on the shelves and stationary channels guide the shelves in a space saving vertical orientation along one conveyor run and in the load carrying horizontal orientation along the other conveyor run. Positive control for the shelf pivoting is provided by a transition guide channel that engages one of the guide rollers and guides it in a path of general cusp-shape, while movement of the chain carrying the shelf around the chain sprocket will determine an arcuate path for the shelf pivot axis which will cause the other guide roller to cross-over the guide channel for the one guide roller and enter its guide channel. One roller and its guide channel are in a plane parallel and spaced from the plane of the other roller and its guide channel.

12 Claims, 2 Drawing Figures

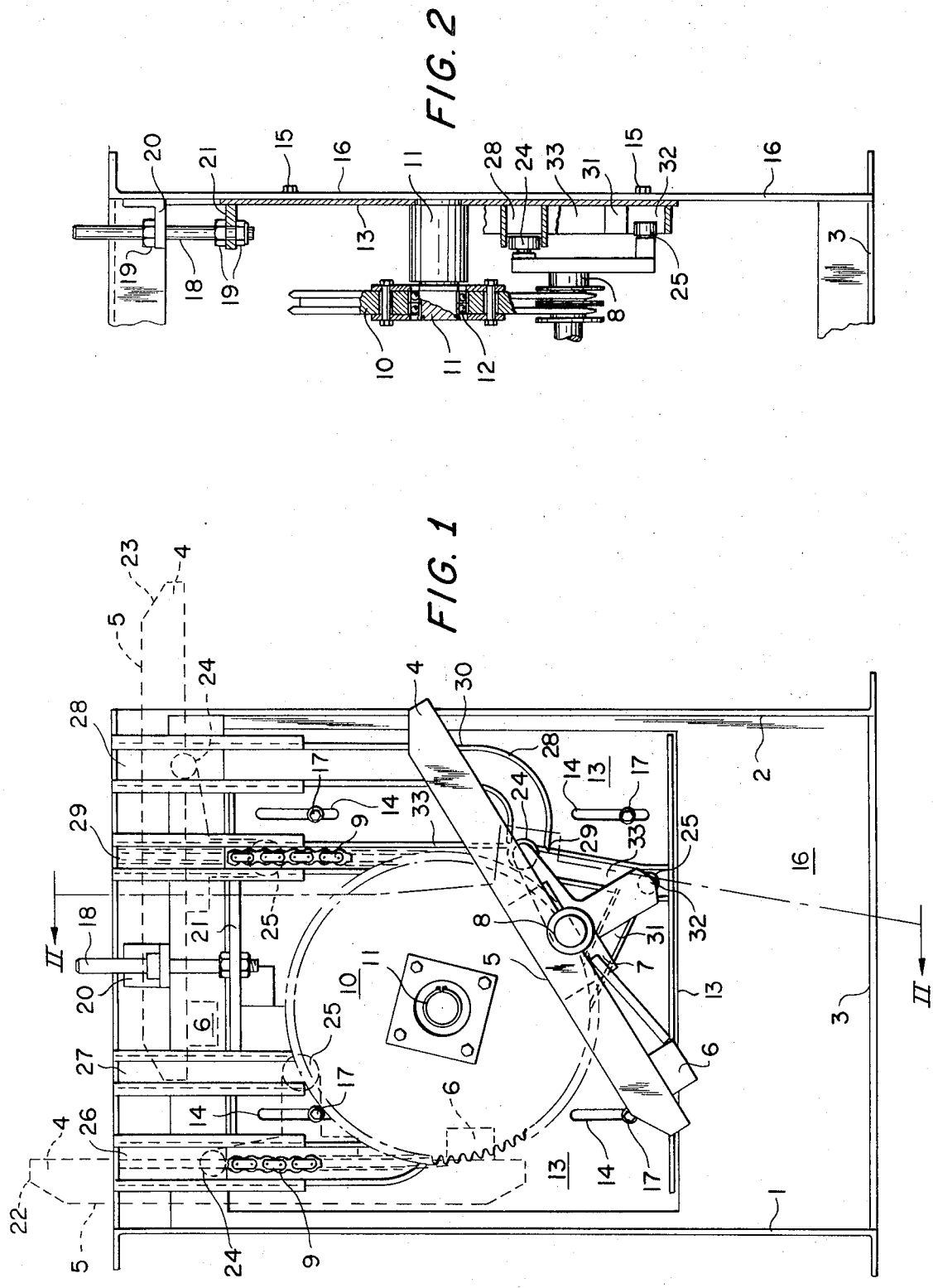

VERTICAL CONVEYOR SHELF TILTING MECHANISM

BACKGROUND OF THE INVENTION

The vertical shelf conveyor of U.S. Pat. No. 2,747,724 to Andrew T. Kornylak, issued May 29, 1956 discloses opposed pairs of upper and lower rotatably mounted sprockets drivingly carrying respective endless chains, with a plurality of load carrying shelves mounted at space intervals along the chains, with each having opposed bearings on the chains for tilting movement of the shelves with respect to the chains. Stationary guide tracks are provided at each side of the conveyor for engaging respectively two guide rollers rigidly secured to each side of each shelf, for controlling the pivotal orientation of the shelves so that during the return vertical run of the shelves they are vertically oriented to save space and during their load vertical run, in either up or down travel, they are horizontally oriented for supporting the load. With such a system, it is necessary to have the guide channel of one roller cross over the guide channel for the other roller, which presents an interference problem in that one guide channel and roller lies in a vertical plane spaced from and parallel to the other guide channel and roller for each side of the conveyor. This interference problem has been solved by discontinuing the guide channels at appropriate places where the rollers cross over, which creates a problem that there is an uncontrolled dead-centered condition at the crucial moment when one of the guide rollers is passing through a cross over gap in the track system. During high speed operation under adverse conditions such as corrosion, vibration, and the like, the rollers have jumped from their tracks and fouled the conveyor.

SUMMARY OF THE INVENTION

The present invention relates to a conveyor of the above mentioned type disclosed in the Kornylak patent. The present invention provides cross-over control for the tilting of the shelf that will trap one of the rollers while the mating roller passes through the gap during cross-over, which in cooperation with the fixed arcuate path of the shelf pivot as the chain travels around the sprocket will provide for positive control eliminating the possibility of track and roller disengagement under adverse conditions.

Cross-over control may be provided on one or both sides of the conveyor. The transition channel for controlling the movement of and trapping one of the rollers will determine a generally cusp-shaped path of travel for the one track guide roller while the other roller moves through the cross-over gap and into its guide channel. This cusp is particularly provided by an entrance channel forming an acute angle with an exit channel, with each entrance, and exit channel forming an obtuse angle with the dwell channel portion. The roller under control during cross-over will be in the dwell channel portion during the critical point when the cross-over roller moves through the gap, and preferably the dwell channel portion is generally perpendicular to the cross-over channel at the cross-over gap for maximum control.

BRIEF DESCRIPTION OF THE DRAWING

Further objects, feature and advantages of the present invention will become more clear from the following detailed description of a preferred embodiment of the invention as shown in the attached drawing, wherein:

FIG. 1 is an elevational view of the lower portion of a vertical conveyor according to the present invention looking from the inside towards the outside; and FIG. 2 is a partial cross-sectional view taken generally along line II—II.

DETAILED DESCRIPTION OF THE INVENTION

Only one lower side of the conveyor has been shown in the drawing since reference may be made to the above-mentioned Kornylak patent for a showing of a complete conveyor. The control provided by the present invention may be on both sides of the conveyor, on only one side of the conveyor, both at the top and at the bottom, or only at the top or only at the bottom.

The roller and guide channel control for tilting the conveyor shelves at the bottom of their run, for purposes of illustration, are shown in FIG. 1 and FIG. 2. In a conventional manner, the lower end of the conveyor may be provided with side frame pieces 1, 2 that are secured as by welding to a lower plate 3 that usually rests on the floor of the lowest level to be served. The frame may be open and mounted within an existing trunk, or the trunk may be integral with the frame and constructed in a factory. A plurality of shelves 4 are provided with load supporting surfaces 5, which in this case are generally planar. Usually such a shelf is provided by a plurality of fingers that extend parallel to the plane of FIG. 1 and are secured together by a rear cross-brace 6 and a central cross-brace 7 to provide a rigid shelf for each unit. Each shelf 4 is pivotally mounted by means of a bearing 8 to an endless chain 9. The chain 9 extends in a closed path as more clearly shown in the aforementioned Kornylak patent, and has a plurality of such shelves 4 mounted at uniform spaced intervals. Usually, each side of the conveyor is provided with such a chain 9 and bearing means 8 for mounting the shelves 4 therebetween, although only one chain has been shown in the drawing for one side, and for purposes of a specific illustration, it may be assumed that the other side is a mirror image. The upper end of the chain 9 is preferably mounted about a sprocket wheel (not shown), and the lower end of the chain is interengaged and mounted about a sprocket wheel 10. Suitable means, such as a shaft 11 is provided to mount the sprocket wheel 10 about a stationary horizontal axis, preferably with the interposition of a bearing 12. At least one of the sprockets is preferably driven to accordingly move the chain 9 in its endless path with the shelves mounted thereon.

Particularly for adjustment of the chain tension, the shaft 11 is mounted by means of welding or the like on a plate 13, which plate 13 has a plurality of vertically elongated slots 14, four being shown, which slots 14 respectively receive the shafts of bolts 15 that are secured as by welding to the stationary side plate 16 that is rigidly secured to the frame side members 1, 2. Nuts 17 are threaded on the terminal ends of the bolts 15 to clamp the plate 13 rigidly against the frame plate 16, in a vertically adjusted position as determined by the relative position of the bolts 15 within the elongated slots 14. To further accomplish this adjustment, a threaded shaft 18 is provided with lock and adjusting nuts 19 that in cooperation with the bracket 20 rigidly secured to the frame plate 16 and the bracket 21 rigidly secured to the adjustment plate 13, will provide power means for moving the plate 13 in a vertical direction relative to the stationary plate 16, for adjustment of the chain tension, and the like.

As shown in FIG. 1, in the dotted line position of 22, the shelves 4 will assume an orientation wherein their load supporting surfaces are generally vertical for one of the generally vertical runs of the chain 9, which run is vertically downward in the specific illustration. This will be the return run of the conveyor shelves, where they are held vertical for economy of space. During the load carrying run of the conveyor, which is vertically upward in the specific illustration, the shelves will assume an orientation wherein their load supporting surfaces 5 will be generally horizontal, as shown in the dotted line position 23. To determine these orientations, each shelf is provided with a first guide roller 24 and a second guide roller 25, each of which is provided with a generally horizontal axis of rotation fixedly oriented with respect to the shelf 4 and forming with the axis of rotation of the bearing 8 a generally L-shape. That is, the plane determined by the axis of the first roller 24 and the axis of the bearing 8 intersects the plane determined by the axis of the second roller 25 and the axis of the bearing 8, most preferably at a right angle.

In the vertical orientation for the load supporting surface 5 as shown in the dotted line position 22, the first guide roller 24 will ride within a generally U-shaped channel 26 that is linear and vertical, and the second guide roller 25 will travel in an adjacent spaced parallel generally U-shaped guide channel 27. In the orientation of the shelves according to the dotted line position 23 wherein their load supporting surfaces are generally horizontal, the guide roller 24 will be carried within a vertical linear U-shaped guide channel 28, and the guide roller 25 will be carried within a similar spaced guide channel 29. During movement of the conveyor shelves in the endless path of the chain 9, the axis of the bearing 8 will in the specific illustration follow the same path of the chain 9, although it is contemplated that it may be slightly offset from the chain 9 to follow a similar parallel path. As shown in FIG. 2, the plane of the guide roller 24 is parallel to and spaced from the plane of the guide roller 25, and accordingly the guide channels 26 and 28 are contained generally within a vertical plane parallel to and spaced from the vertical plane carrying therein the guide channels 27, 29. However, it is contemplated that the guide rollers 24, 25 and the guide channels 26, 27, 28, 29 may all be contained within a common plane.

In moving from the dotted line position 22 wherein the shelf load bearing surface 5 is vertical to the dotted line position 23 wherein the shelf load bearing surface 5 is horizontal, the shelf 4 will tilt as the chain 9 travels in the arcuate, particularly semi-circular, path of the outer diameter of the sprocket wheel 10. An intermediate position of the shelf 4 is shown in full lines in FIG. 1. Thus, it is seen that the shelf 4 will rotate 90° about its axis 8 in traveling from the dotted line position 22 through the full line position and to the dotted line position 23. In the dotted line position 22, the guide roller 25 is to the right of the guide roller 24, whereas in the dotted line position 23, the guide roller 24 is to the right of the guide roller 25; thus, it is seen that the guide roller 24 must cross over from the left to the right side of the guide channel 29 for the guide roller 25.

Whether the guide rollers 24, 25 are in the same plane or in spaced planes, there will be an interference problem such that the guide channel for one of the rollers must be interrupted as its guiding path crosses over or intersects the guiding path of the guide channel for the other roller. This intersection or cross-over may take place between either the guide channels 26, 27 or the guide channels 28, 29 and either at the bottom or the top of the conveyor system. For purposes of specific illustration, the cross-over has been shown as taking place between the guide channels 28, 29 at the lower end of the conveyor run. As specifically shown, there is provided a generally right angle elbow transition guide channel 29 that has an entrance end 29 extending generally horizontally and an exit end 30 extending generally vertically and in full alignment with the guide channel 28. Further, there is provided a composite transition guide channel for the roller 25, which includes a first entrance portion 31, a dwell or intermediate portion 32, and an exit portion 33, all of which with the assumption that the sprocket wheel in FIG. 10 is driven in the counter-clockwise direction. It is seen that the exit portion 33 is aligned with the guide channel 29, and preferably the exit portions 33, 30 are respectively overlapped with respect to the guide channels 29, 28, to provide continuous guiding of their respective rollers throughout the entire adjustment range provided for by the above-mentioned slot 14 and bolt 15 vertical adjustment, with it being understood that the transition guide channel 28 and the transition guide channel 31, 32, 33 are all rigidly secured to and carried by the vertically adjustable plate 13 so that their relative position to the sprocket 10 may be unchanged despite vertical adjustment of the sprocket for chain tension control.

As seen from FIG. 1, the roller 24 in the full line position of the shelf 4 is uncontrolled, that is, it has not yet entered the entrance end of the transition guide channel 28, that is, the roller 24 is in its cross-over position, because the guide channel 28 may not extend across the guide channel portion 33 due to the aforementioned interference. In the full line position, the path of movement for the axis of the bearing 8 is determined by the interengagement of the chain 9 and the sprocket 10, which path will be semi-circular and positively restrained from any deviation. Since there is no restraint of any kind on the roller 24, that is there is no guiding of the roller 24, the tilting of the shelf 4 in the solid line position will be determined solely by the roller 25. As seen, the roller 25 in the full line position is completely within the channel portion 32 and effectively trapped therein while the roller 25 effectively dwells and the shelf 4 pivots clockwise as the bearing 8 moves counter-clockwise along the path of the outer periphery of the sprocket wheel 10; during this movement, the roller 24 will cross over the guide channel 33 and move into the transition guide channel 28. In the full line position shown in FIG. 1, the tilting orientation of the shelf 24 is positively restrained in that the axis of the bearing 8 is fixed due to the interengagement of the chain 9 with the sprocket wheel 10 under tension (considering the chain 9 at rest for purposes of analysis), and the side walls of the dwell channel portion 32 will prevent the roller 25 from moving along an arcuate path concentric with the axis of the bearing 8. Thus, the path of the roller 25 is such that it will move along the entrance channel portion 31 as the roller 24 approaches the path of the channel portion 33, the roller 25 will be within the dwell or intermediate channel portion 32 as the roller 24 crosses over or moves over the path of the channel portion 33, and the roller 25 will move within the channel portion 33 as the roller 24 moves within the transition channel 28. Thus, during the critical cross-over of the roller 24, the roller 25 will change direction of travel and effectively dwell with side restraint so that it is trapped for positive shelf tilting control. Effectively, the transition channel portions 31, 32 and 33 form a path of travel for the roller 25 that is generally cusp-shaped, with the channel portions 31, 33 forming an acute angle with respect to each other and respectively forming obtuse angles with the channel portion 32. Also, the transition channel 31, 32, 33 may be described as substantially Y-shaped with the respect to channel portions being linear. Their linear construction is for purposes of economy, and it is contemplated that the channel portions 31, 32, 33 may be curved.

The guide channel structure to lead the roller 25 from the guide channel 27 to the entrance channel portion 31 and to lead the roller 24 from the guide channel 26 to where it becomes free and unguided as it approaches the guide channel portion 33, has not been shown and may take on any conventional form or be similar in nature to that described above with respect to the two transition channels.

The entire shelf structure has not been shown in FIG. 2, because the portion omitted may be of conventional structure. Further, a portion of the sprocket 10 has been broken away to show its bearing.

A specific review of the operation will not be made, since the operation is set forth above along with the structure permitting such operation. In general, the transition guide channels of the present invention provide for positive control of the shelf tilting and specifically trap one of the guide rollers while the other guide roller passes through its critical cross-over position wherein it is uncontrolled. Such trapping being accomplished by a generally Y-shaped or equivalent generally cusp-shaped transition guide channel for the guide roller that is guided with a dwell during cross-over.

While a specific preferred embodiment of the present invention has been described and shown in detail for purposes of illustration, further embodiments, variations and modifications are contemplated within the spirit and scope of the present invention, as defined by the following claims.

What is claimed is:

1. A tilting shelf, vertical conveyor, comprising: at least one rotatably mounted sprocket wheel having a generally horizontal axis of rotation; an endless chain in driving interengagement with said sprocket wheel and being guided to have a first generally vertical conveyor run on one side of said sprocket wheel and a second generally vertical conveyor run on the opposite side of said sprocket wheel; means for driving said sprocket wheel and chain in one conveying direction, with said one conveyor run traveling generally vertically to said sprocket wheel and said second conveyor run traveling generally vertically away from said sprocket wheel; a plurality of shelves having load carrying surfaces; bearing means pivotally mounting each of said shelves on said chain for pivotal movement about respective generally horizontal axes; each of said shelves having a first guide roller rotatable about an axis parallel to the axis of pivoting for said bearing means and said sprocket wheel axis, and a second guide roller rotatable about an axis parallel to said axes; the axes of rotation of said first guide roller and said bearing means lying within a plane intersecting the plane having therein the axes of rotation of said second guide roller and said bearing means; first and second stationary guide channels generally parallel to each other and extending along one of said conveyor runs, and respectively guidingly receiving therein said first and second guide rollers; said first and second guide rollers, and said first and second guide channels together constituting means holding said shelves with their load carrying surfaces in one of a generally vertical position and a generally horizontal position during movement along said one of said conveyor runs; third and fourth stationary guide channels generally parallel to each other and extending along the other of said conveyor runs, and respectively guidingly receiving therein said second and first guide rollers; said third and fourth stationary guide channels and said first and second guide rollers together constituting means holding said shelves with their load supporting surfaces in the other of a generally vertical position and a generally horizontal position during movement along said other of said conveyor runs; said first, second, third, and fourth stationary guide channels being so arranged that said first guide roller must cross over said third stationary guide channel to reach said fourth stationary guide channel; first stationary transition guide channel means extending from the cross-over point of said third guide channel to and in alignment with the adjacent end of said fourth guide channel for receiving said first guide roller after it has crossed over said third guide channel and for guiding said first guide roller into said fourth guide channel; second stationary transition guide channel means having a first channel portion guidingly receiving therein said second roller as said first roller approaches said cross-over, a second channel portion guidingly receiving therein said second roller as said first roller crosses over said third guide channel, and a third channel portion receiving therein said second roller as said first roller moves within said first transition guide channel means; said first, second and third channel portions defining a generally cusp-shaped path of travel for said second guide roller as said bearing means travels in an arcuate path concentric with said sprocket and said shelf is tilted to said other position; said second stationary transition guide channel means positively controlling the tilting of its shelf to cause said first guide roller to approach said third guide channel, cross over said third guide channel, and move over and into said first stationary transition guide channel means; and said first, second and third channel portions being uninterrupted with respect to each other.

2. The conveyor of claim 1, wherein said first and third transition channel portions intersect each other with an acute angle and respectively intersect said second transition portion with an obtuse angle.

3. The conveyor of claim 2, wherein each of said transition channel portions is linear.

4. The conveyor of claim 3, wherein said second transition channel portion extends generally vertically.

5. The conveyor of claim 4, wherein said first transition channel has a generally horizontal entrance adjacent and intersecting said third guide channel generally at a right angle, a generally vertical exit aligned with said fourth guide channel, and an intermediate generally right angle arcuate portion.

6. The conveyor of claim 5, wherein said first guide roller, said first guide channel, said first transition guide channel means, and said fourth guide channel all lie substantially within the same vertical plane perpendicular to said axes; and said second guide roller, said second guide channel, said third guide channel and said second transition guide channel means all lie generally within the same vertical plane spaced from and parallel to said last mentioned vertical plane.

7. The conveyor of claim 2, wherein said second transition channel portion extends generally vertically.

8. The conveyor of claim 7, wherein said first transition channel has a generally horizontal entrance adjacent and intersecting said third guide channel generally at a right angle, a generally vertical exit aligned with said fourth guide channel, and an intermediate generally right angle arcuate portion.

9. The conveyor of claim 8, wherein said first guide roller, said first guide channel, said first transition guide channel means, and said fourth guide channel all lie substantially within the same vertical plane perpendicular to said axes; and said second guide roller, said second guide channel, said third guide channel and said second transition guide channel means all lie generally within the same vertical plane spaced from and parallel to said least mentioned vertical plane.

10. The conveyor of claim 2, wherein said first transition channel has a generally horizontal entrance adjacent and intersecting said third guide channel generally at a right angle, a generally vertical exit aligned with said fourth guide channel and an intermediate generally right angle arcuate portion.

11. The conveyor of claim 10, wherein said first guide roller, said first guide channel, said first transition guide channel means, and said fourth guide channel all lie substantially within the same vertical plane perpendicular to said axes; and said second guide roller, said second guide channel, said third guide channel and said second transition guide channel means all lie generally within the same vertical plane spaced from and parallel to said last mentioned vertical plane.

12. The conveyor of claim 2, wherein said first guide roller, said first guide channel, said first transition guide channel means, and said fourth guide channel all lie substantially within the same vertical plane perpendicular to said axes; and said second guide roller, said second guide channel, said third guide channel and said second transition guide channel means all lie generally within the same vertical plane spaced from and parallel to said last mentioned vertical plane.

* * * * *